United States Patent
Alexander et al.

(10) Patent No.: US 11,775,415 B2
(45) Date of Patent: Oct. 3, 2023

(54) DEBUGGING INSTRUCTION REGISTER TO RECEIVE AND INPUT DEBUGGING INSTRUCTIONS TO A PROCESSOR FOR A THREAD OF EXECUTION IN A DEBUG MODE

(71) Applicant: Graphcore Limited, Bristol (GB)

(72) Inventors: Alan Graham Alexander, Wolton-under-Edge (GB); Graham Bernard Cunningham, Chippenham (GB)

(73) Assignee: GRAPHCORE LIMITED, Bristol (GB)

( * ) Notice: Subject to any disclaimer, the term of this patent is extended or adjusted under 35 U.S.C. 154(b) by 443 days.

(21) Appl. No.: 16/527,454

(22) Filed: Jul. 31, 2019

(65) Prior Publication Data
US 2020/0319991 A1   Oct. 8, 2020

(30) Foreign Application Priority Data
Apr. 3, 2019 (GB) ..................... 1904675

(51) Int. Cl.
*G06F 9/30* (2018.01)
*G06F 9/38* (2018.01)
(Continued)

(52) U.S. Cl.
CPC ........ *G06F 11/366* (2013.01); *G06F 9/30101* (2013.01); *G06F 9/30123* (2013.01);
(Continued)

(58) Field of Classification Search
CPC .................. G06F 9/30101; G06F 9/3814
See application file for complete search history.

(56) References Cited

U.S. PATENT DOCUMENTS

| | | | |
|---|---|---|---|
| 7,080,283 B1 * | 7/2006 | Songer ................ | G06F 11/3636 714/30 |
| 2002/0065646 A1 * | 5/2002 | Waldie ................ | G06F 11/3648 703/26 |

(Continued)

FOREIGN PATENT DOCUMENTS

| | | |
|---|---|---|
| EP | 0391173 A2 | 10/1990 |
| EP | 2619670 | 7/2013 |
| EP | 2619671 | 7/2013 |

OTHER PUBLICATIONS

Combined Search and Examination Report dated Apr. 8, 2020 for Patent Application No. GB1904675.4.

*Primary Examiner* — Jacob Petranek
(74) *Attorney, Agent, or Firm* — HAYNES AND BOONE LLP

(57) ABSTRACT

A processor comprising at least one processing module, each processing module comprising: an execution pipeline; memory; an instruction fetch unit comprising operable to switch between an operational mode and a debugging mode, the instruction fetch unit being configured so as, when in the operational mode, to fetch machine code instructions from the memory into the execution pipeline to be executed; and a debug interface for connecting to a debug adapter. The debug interface comprises a debug instruction register enabling the debug adapter to write a machine code instruction to the debug instruction register, and wherein the instruction fetch unit is configured so as, when in the debug mode, to fetch instructions from the debug instruction register into the pipeline instead of from the memory.

21 Claims, 4 Drawing Sheets

(51) Int. Cl.
*G06F 11/36* (2006.01)
*G06F 9/48* (2006.01)

(52) U.S. Cl.
CPC .......... *G06F 9/3802* (2013.01); *G06F 9/3814* (2013.01); *G06F 9/3851* (2013.01); *G06F 9/3867* (2013.01); *G06F 9/48* (2013.01)

(56) References Cited

U.S. PATENT DOCUMENTS

| | | | |
|---|---|---|---|
| 2003/0028696 A1* | 2/2003 | Catherwood | G06F 9/325 710/260 |
| 2005/0188358 A1* | 8/2005 | Johnson | G06F 11/3648 717/129 |
| 2005/0216792 A1* | 9/2005 | Tsuboi | G06F 11/3644 714/38.1 |
| 2007/0220334 A1* | 9/2007 | Pedersen | G06F 11/2236 714/30 |
| 2017/0351518 A1* | 12/2017 | Tran | G06F 9/30189 |

* cited by examiner

DEBUGGING INSTRUCTION REGISTER TO RECEIVE AND INPUT DEBUGGING INSTRUCTIONS TO A PROCESSOR FOR A THREAD OF EXECUTION IN A DEBUG MODE

CROSS-REFERENCE TO RELATED APPLICATIONS

The present application claims priority to United Kingdom Patent Application No. 1904675.4, filed Apr. 3, 2019, of which is hereby incorporated by reference in its entirety.

TECHNICAL FIELD

The present disclosure relates to a debugging mechanism for debugging a processor. In particular, it relates to a mechanism for providing debug instructions to be executed by the processor when in a debug mode.

BACKGROUND

FIG. 1 shows an example of the architecture of a known processor 2 including a debugging mechanism. The processor 2 comprises a memory 22, an instruction fetch unit 14, an execution pipeline 13, and a set of program state registers 26, all implemented on the same chip (i.e. die). The memory 22 comprises a program memory for storing a program comprising machine code instructions to be executed through the pipeline 13. The processor 2 also comprises data memory for storing data to be operated upon by the program when executed, and resulting from operations performed by the executed program. The data memory and program memory may be implemented in different regions of the same physical memory unit or may be implemented in separate memory units.

The instruction fetch unit 14 is arranged to fetch the instructions from the memory 22 and pass them into the execution pipeline 13 to be executed by the pipeline. The program state registers 26 are arranged to hold values representing a program state of the program when being executed. These include operand registers for holding operand values. Some of the instructions executed by the pipeline will be load instructions which load values from memory into the operand registers. Other instructions such as arithmetic instructions operate on the values loaded into the operand registers and place the results of these operations in others of the operand registers. Some others of the instructions executed by the pipeline will be store instructions which then store the results from the operand registers back into memory. The program state registers 26 may also include one or more control state registers (CSRs), e.g. a floating point status register.

Another piece of program state held in one of the program state registers 26 is the program counter value, held in a program counter register. The instruction fetch unit 14 comprises instruction fetch logic 60 configured to fetch instructions from a location in the memory 22 specified by the program counter value in the program counter register. Each time it fetches an instruction from the location specified by the current program counter value, the instruction fetch logic 60 also then automatically increments the program counter value in the program counter register to indicate the next sequential instruction fetch location. The program counter value can also be branched by executing branch instructions through the pipeline 13.

The processor 2 further comprises a debug ROM 61 and debug interface 62, and the instruction fetch unit 14 comprises debug mode switching logic 70. The debug mode switching logic 70 is arranged to receive a debug enable signal (DB) indicating whether the fetch unit 14 is to operate in a debug mode or instead in the normal operating mode (i.e. non-debug mode). The processor 2 typically begins in the normal mode of operation, running the program from the memory 22. The debug mode may be triggered automatically by the pipeline 13, memory 22 or another component of the processor 2 upon encountering an exception or error during runtime (i.e. during normal operation). And/or, the processor 2 may enable the debug mode to be triggered manually by intervention from a human user. In this case the debug enable signal (DB) may be issued via the debug interface 62 as shown in FIG. 1. Or in the case where the debug mode is triggered automatically, DB may be issued from the pipeline 13 or memory 22.

In the normal, operational mode, the fetch logic 60 fetches instructions from the memory 22 based on the program counter value, as discussed previously. In the debug mode however, mode switching logic 70 in the fetch unit 14 causes the fetch logic 60 to fetch instructions from the debug ROM 61 instead of from the memory 22. The debug ROM 61 stores debug code for testing some aspect of processor 2 or the program being run thereon, e.g. some aspect related to the error or exception that triggered the debug mode. When the debug mode is triggered, the processor 2 automatically saves the program counter value and other program state from the program state registers 26. Depending on implementation this may be done by some store instructions in the debug code, or automatically by hardware in the processor, or a combination of both (e.g. the hardware automatically saving what's absolutely necessary to jump to the debug code without corrupting the program state). The fetch logic 60 then uses the program counter to point to locations in the debug ROM 61 rather than the memory 22, which involves jumping to a new program counter value and then automatically incrementing through debug code locations, instead of the program that was running until the debug mode was triggered. The fact of having saved the program state enables the program to continue where it left off when the debug mode is de-asserted and the processor 2 returns to normal operation.

The debug interface 62 comprises a set of registers 65 which are accessible by an external (i.e. off-chip) debug adapter 63. At least one of these registers 65 is available for the debug adapter 63 to write to, in order to control one or more aspects of the debug behaviour of the processor 2. This is conventionally used to allow a developer to manually trigger the debug mode: by setting a bit in one of these registers, the developer can force the processor to switch to debug mode. At least one other of the registers 65 in the debug interface is arranged as an output register for outputting to the debug adapter 63. The debug interface 62 is operable to receive a request from the debug adapter 63 requesting to read the value currently held in an internal register within the processor 2, e.g. one of the program state registers 26, this internal register being identified by the debug adapter 63 in its request. The debug interface 62 is configure so as, in response to this request, to retrieve the value from the requested internal register and place the result in the output register in the registers 65 accessible to the debug adapter 63, for the debug adapter 63 to read from there. E.g. this may allow the debug adapter 63 to (vicariously) read the value of the program counter, or the value in one of the operand registers or CSRs.

The debug adapter 63 may be coupled to a user terminal 64 to enable a human user (e.g. developer) to control the debug adapter, e.g. to cause it to send requests to read the desired internal registers of the processor 2, and to view the results through a suitable user interface of the terminal 64.

SUMMARY

An issue with existing debug mechanisms is that the on-chip debug ROM 61 takes up a lot of hardware on the chip, which is wasteful in terms of silicon footprint. This can be especially the case when the cost is paid per core in a processor comprising multiple cores. An alternative would be to use an external (off-chip) debug ROM, but an issue with that approach is that it would require a bespoke debug adapter. Conventional debug adapters 63 have the ability to read and write value to/from the registers 65 of the debug interface 62, but not to inject code from an external source into the pipeline 13. Another option would be to include the debug code in the program memory 22. However, then the debug code would take up valuable space in the program memory 22. This is especially problematic for processors with only a small program memory. Yet another possibility is to provide a dedicated hardware interface to allow the debug adapter 63 to write to the program memory 22 as-and-when needed. However that would require a relatively large amount of extra hardware such as additional memory ports, which is again wasteful of silicon.

It would be desirable to provide a mechanism that does not require an on-chip debug ROM in order to store all the debug code that might be required, but that also can be implemented using the existing functionality of a conventional or "off-the-shelf" debug adapter, and without requiring too much extra dedicated hardware on-chip and without wasting program memory on debug code.

According to one aspect disclosed herein, there is provided a processor comprising at least one processing module, each processing module comprising: an execution pipeline; memory; an instruction fetch unit comprising operable to switch between an operational mode and a debugging mode, the instruction fetch unit being configured so as, when in the operational mode, to fetch machine code instructions from the memory into the execution pipeline to be executed; and a debug interface for connecting to a debug adapter. The debug interface comprises a debug instruction register enabling the debug adapter to write a machine code instruction to the debug instruction register, and wherein the instruction fetch unit is configured so as, when in the debug mode, to fetch instructions from the debug instruction register into the pipeline instead of from the memory.

Thus the disclosed arrangement implements a debug mechanism on the processor with minimal hardware, but whilst still enabling the debugging to be controlled from a standard or conventional debug adapter. As discussed, conventional debug adapters have the ability to write to registers in the debug interface. By linking one such register to the instruction fetch unit, as disclosed herein, this enables the debug adapter to write an instruction to this register as it would any other value to any other register in the debug interface. The fetch unit is configured to then fetch from this register instead of from a debug ROM or program memory in event of a switch to the debug mode, e.g. in response to an exception. Thus the processor provides a mechanism whereby the debug adapter can "inject" an executable machine code instruction into the execution pipeline for debugging purposes.

In embodiments, the debug interface may comprise only one debug instruction register and the debug instruction register may be arranged to hold only a single machine code instruction at a time.

In embodiments, in the debug mode, the instruction fetch unit may be configured to be clocked to fetch an instruction from the debug instruction register into the pipeline each time the debug adapter writes a new instruction to the debug instruction register.

In embodiments, each processing module may further comprise a set of program state registers for representing a program state of a program comprising the instructions being fetched from the memory in the operational mode.

The program state may include a program counter value and the program state registers may include a program counter register arranged to hold the program counter value. The instruction fetch stage may be configured so as, when in the operational mode, to fetch instructions from a location in the memory specified by the program counter value in the program counter register, and to increment the program counter value in the program counter register with each instruction fetch. In embodiments, the processor may be configured not to save the program counter upon switching to the debug mode, but instead to leave the program counter value paused in the program counter register until returning to the operational mode, whereupon the instruction fetch stage continues from the program counter value left in the program counter register and the incrementing of the program counter value resumes from there.

In embodiments, the debug interface may further comprise an output register readable by the debug adapter; and the debug interface may be operable to receive a request from the debug adapter requesting to read a specified one of the program state registers, and may be configured to respond to the request by copying a value from the specified program state register into the output register to be read by the debug adapter.

In embodiments, the debug interface may further comprise one or more debug data registers each arranged to be either or both of: writeable by the debug adapter and readable by debug instructions executed by the pipeline, and/or readable by the debug adapter and writeable by the debug instructions.

In embodiments, the processor may comprise no hardware configured to automatically save any of the program state from the program state registers upon switching to the debug mode; and instead, some of the debug instructions may save the program state to an external source via at least one of the one or more debug data registers, and then re-store the program state in the program state registers before returning to the operational mode.

In embodiments, the instruction fetch unit may be configured to fetch instructions from each of a plurality of concurrent threads and interleave them through the pipeline each in a respective time slot in a recurring sequence of time slots, and said program state registers comprise a plurality of sets of context registers, each set arranged to represent a program state of a respective one of the concurrent threads. The debug interface may comprise a context identifier register writeable by the debug adapter to identify one of the time slots, and the instruction fetch unit may be configured to apply the debug mode only in the identified time slot, fetching the instructions from the debug instruction register only in place of the respective thread.

In embodiments, the instruction fetch unit may be configured to continue fetching the instructions of the respective threads in the other time slots, other than the identified time slot, from the memory when the identified time slot is in the debug mode.

In embodiments, the processor may comprise a plurality of said processing modules, and a debug bus for making the connection between the debug adapter and the debug interface on each of the plurality of processing modules, the debug bus being arranged to enable the debug adaptor to access the debug interface on a selected one of said tiles, in order to write to the debug instruction register and any other registers of the debug interface writeable by the debug adapter on the selected tile, and to read from any registers of the debug interface readable by the debug adapter on the selected tile.

For example the bus may be a 1-bit daisy chain bus, daisy-chaining between the plurality of processing modules.

In embodiments, the processor may be implemented on a chip wherein the debug adapter is an external debug adapter, the processor comprising one or more pins for enabling the debug adapter to form said connection from off-chip.

According to another aspect disclosed herein, there is provided a system comprising the processor and the debug adapter.

According to another aspect disclosed herein, there is provided a method of operating a processor comprising at least one processing module; each processing module comprising an execution pipeline, memory, instruction fetch unit and debug interface; wherein the method comprises: operating the instruction fetch unit to switch between an operational mode and a debugging mode, wherein when in the operational mode, the instruction fetch unit fetches machine code instructions from the memory into the execution pipeline to be executed; writing one or more machine code instruction to a debug register in the debug interface; and when in the debug mode, operating the instruction fetch unit to fetch the one or more instructions from the debug instruction register into the pipeline instead of fetching instructions from the memory.

In embodiments the processor, system and/or method may further comprise features in accordance with any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
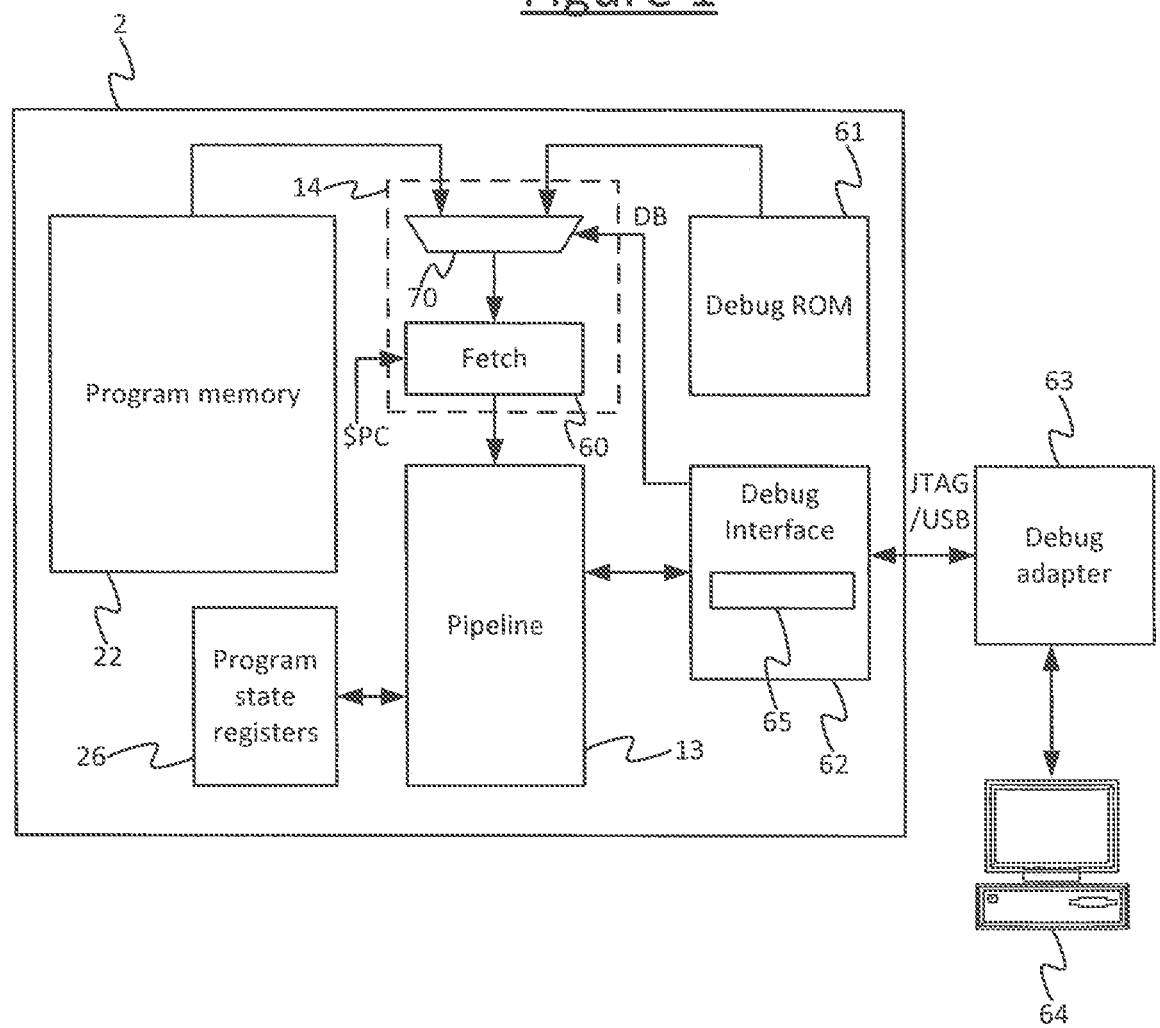
FIG. 1 is a schematic block diagram of a processor with a known debugging mechanism.
Figure 2:
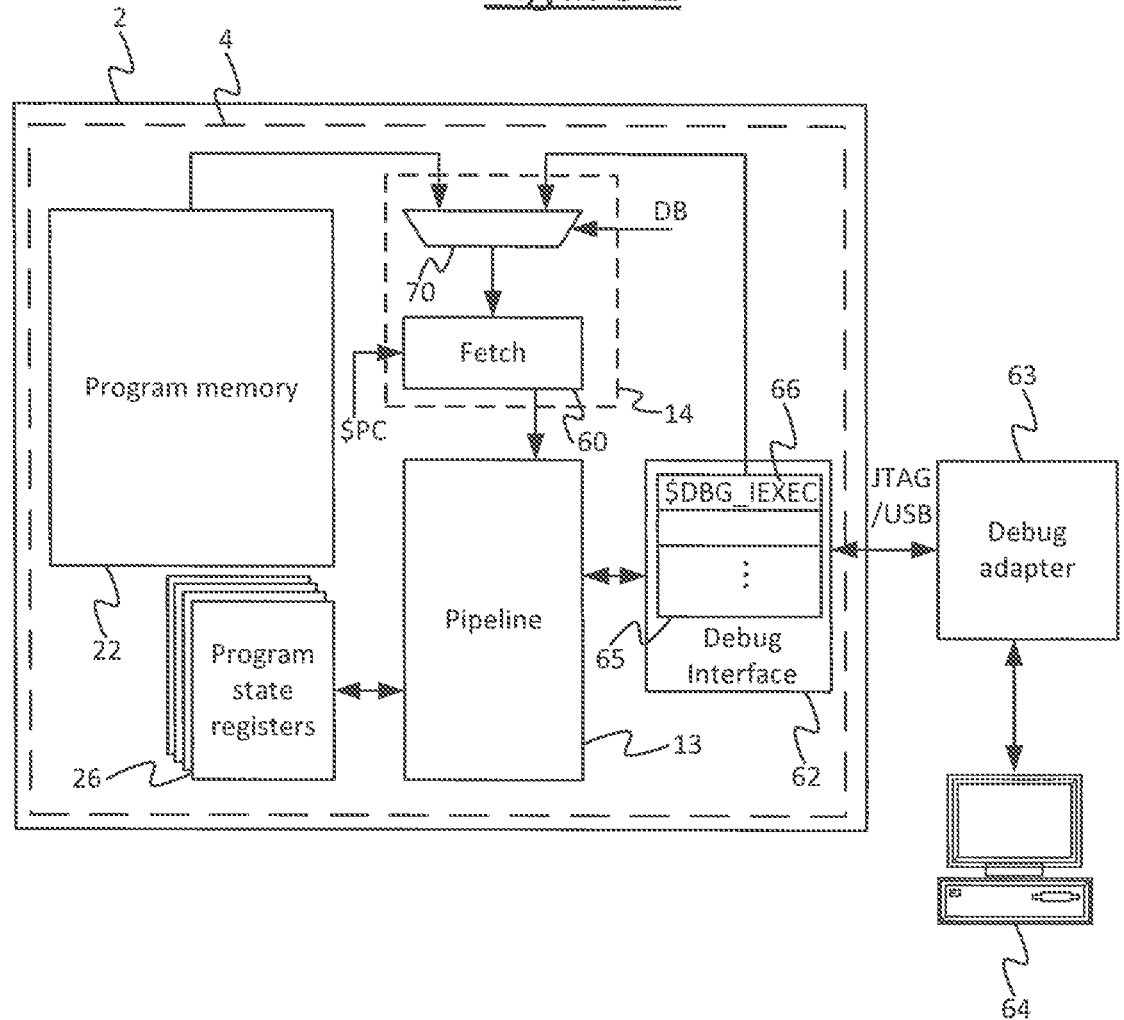
FIG. 2 is a schematic block diagram of a processor with a debugging mechanism in accordance with embodiments disclosed herein.
Figure 4:
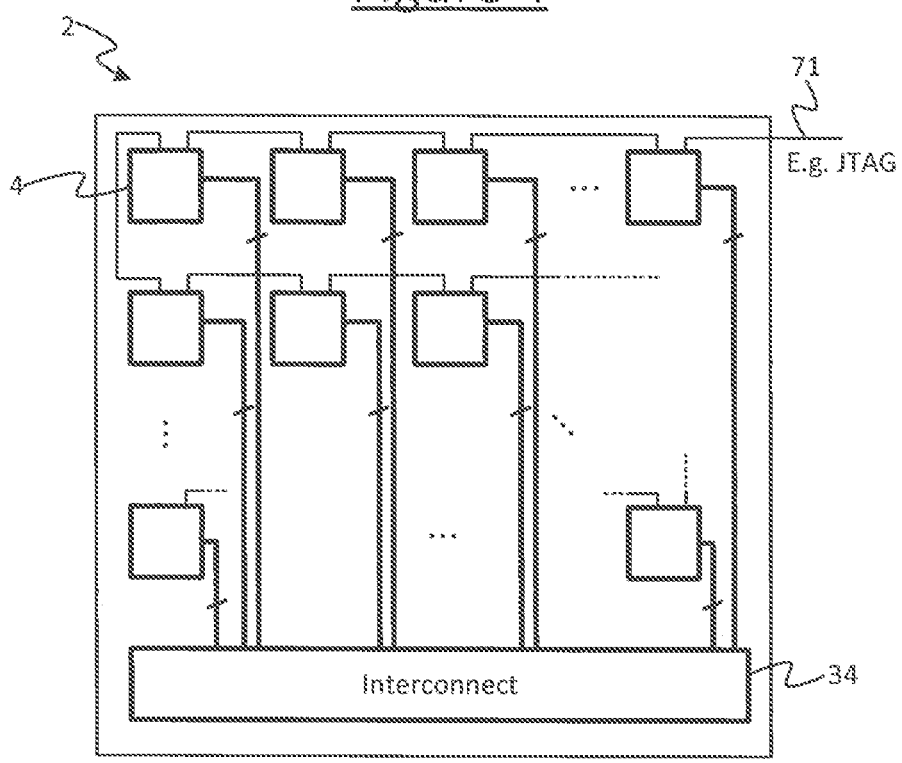
FIG. 4 is a schematic block diagram of a processor comprising multiple tiles and a debug bus serving the tiles.

FIG. 2 shows an example processor in accordance with embodiments disclosed herein. The processor 2 comprises at least one processing module 4. In embodiments, the processor 2 may comprise a plurality of such processing modules each configured as illustrated in FIG. 1. In this case the processing modules 4 may be referred to as tiles. This is illustrated in FIG. 4, to be discussed in more detail later.

Each processing module 4 comprises a respective instance of a memory 22, execution pipeline 13, instruction fetch unit 14, set of program state registers 26, and debug interface 62. On each processing module 4, these components may be configured as described in relation to FIG. 1, except where stated otherwise. I.e. on each processing module 4, the memory 22 stores a program to be executed by the respective pipeline 13 on that processing module 4. The instruction fetch unit 60 is configured (in the normal, operational mode) to fetch instructions from the respective memory 22 on the same processing module 4, as dictated by the program counter, and pass these into the respective pipeline 13 for execution. The debug interface 62 comprises a plurality of registers 65. The debug adapter 63 is exposed to the address space of the registers 65 (but not the internal registers 26) via a memory map. The debug adapter 63 can thus write to at least one of these registers 65 in order to control the debugging on the respective processing module 4. The debug adapter 63 can also read from at least one other of these interface register 65, in order to obtain values placed there by the debug interface 62 from other, internal ones of the processor's registers (e.g. the program state registers 26) in response to requests form the debug adapter 63.

Figure 3:
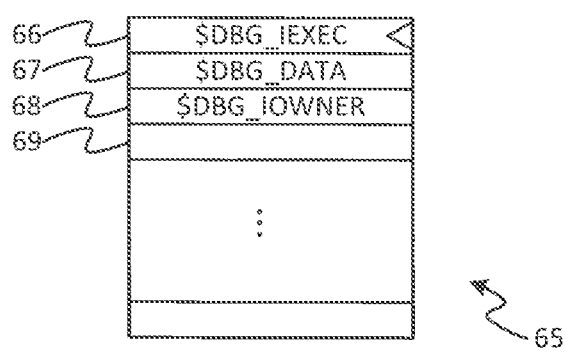
FIG. 3 is a schematic block diagram showing registers of a debug interface and how they may be used in accordance with embodiments.

Further example details of the registers 65 in accordance with embodiments disclosed herein are shown in FIG. 3, to be discussed in more detail later.

It will be appreciated that the processor 2 also comprises suitable connection means for connecting the debug interface 62 to the external debug interface 63 to enable it to access the registers 65 in the debug interface 62. E.g. the means of connection may comprise one or more pins of the IC package in which the processor chip 2 is packaged. There also be required a mechanical connector to connect from the board on which the package is mounted to the debug adapter 63. Alternatively the debug adapter 63 could be mounted on the same board. In embodiments the standard used to interface the debug adapter 63 to the processor 2 may be JTAG or USB.

The discussion of FIGS. 2 and 3 that follows may describe the operation of the debugging mechanism from the perspective of a given processing module or tile 4, but in the case where the processor 2 comprises multiple such processing modules tiles 4, it will be appreciated that the described teachings may apply equally to each of them.

In some embodiments, the processing module 4 may take the form of a multi-threaded processing module (sometimes also called a barrel threaded processing module). In this case, the program stored in the memory 22 comprises a plurality of threads, each comprising a sequence of machine code instructions. Further, the instruction fetch unit 14 is configured (at least in the normal operational mode) to execute multiple ones of these threads concurrently. That is, it fetches instructions of the different threads from memory 22 in turn according to a round robin schedule, interleaving them through the execution pipeline 13. Thus each of the concurrently executing threads is allocated its own time slot in a repeating sequence of time slots. Also, the program state registers 26 comprise a plurality of sets of context registers, each arranged to hold the program state (i.e. context) of a respective one of the threads being executed concurrently at any given time.

When the execution pipeline 13 is executing an instruction of a given one of the concurrent threads in its respective time slot, it does so using the context registers 26 corresponding to the respective time slot (so load and store instructions load/store to the operand registers of that context, and arithmetic instructions operate on the operand registers in the respective context, and so forth). The term "context" strictly refers to the program state of a given thread as held in the respective set of context registers 26, but it is also sometimes used as a short-hand to refer to the respective set of context registers and the corresponding timeslot (i.e. the resources allocated for executing a given one of the multiple concurrent threads). For completeness, note also that the number of threads that can be executed concurrently at any one time is typically smaller than the total number of threads stored in memory 22. E.g. in embodiments the processing module 4 may comprise support for four, six or eight concurrent threads; and up to that number of threads, from amongst a potentially larger number of threads in memory 22, are selected to run concurrently at any one time.

According to the present disclosure, the processing module 4 does not comprise a debug ROM 61. Instead, it comprises a debug instruction register 66 amongst the registers 65 in the debug interface 62. See FIG. 3. The debug instruction register 66 is sized so as to be able to accept a machine code instruction in accordance with the same instruction format used by the pipeline 13. In embodiments, it is sized so as to accept only a single instruction, i.e. a single opcode and its associated opcode fields. In effect, the debug ROM 61 has been shrunk to just a single, one-instruction register (that also, unlike debug ROMs, can be written to by the debug adapter 63). However, in other implementations it is not excluded that the debug instruction register 66 could accept a small queue of instructions, or a small bundle of (e.g. 2) instructions to be executed in parallel (if the processor supports this).

The debug mode switching logic 70 is coupled not to a debug ROM 61, but instead to the debug instruction register 66 in the registers 65 of the debug interface 62. In the normal, operational mode, the fetch unit 14 operates normally as described in relation to FIG. 1, with the debug mode switching logic 70 being set to couple the instruction fetch logic 60 to the program memory 22. However, when the debug mode is activated, the debug enable signal DB is asserted. This causes the debug mode switching logic 70 switch to couple the instruction fetch logic 60 to the debug instruction register 66 in debug interface 62, instead of to the memory 22. When the instruction fetch logic 60 next fetches an instruction to pass into the pipeline 13, it fetches the next instruction from the debug instruction register 66, instead of from memory 22.

The debug adapter 63 is able to write a machine code instruction to the debug instruction register 66 as it would a value to any other writeable register 65 in the debug interface 62. Thus by coupling one such register to the instruction fetch unit 14, this enables the debug adapter 63 to inject a debug instruction into the pipeline 13.

The source of the debug code could in general be an internal memory in the debug adapter 63, an external debug ROM that the adapter 63 is connected to, or the user terminal (host terminal) 64 which the debug adapter 63 is connected to. Preferably it is the latter so there is no requirement for additional debug memory anywhere in the system.

In embodiments, in the debug mode, the instruction fetch logic 60 is clocked to fetch the instruction from the debug instruction register into the pipeline 13 each time the debug adapter 63 performs another write to the debug instruction register. This means that in the debug mode, the fetch logic 60 does not require the program counter value. Hence in embodiments, the processing module 4 need not save the program counter value when the debug mode is triggered. Instead this value can be left paused in the program counter register, and, when the debug mode is reactivated, the program can simply resume where it left off from the same program counter value as left in the program counter register (without needing to reload it). This advantageously provides a very simple mechanism.

The debug mode may be trigged automatically by the pipeline 13, e.g. in response to encountering an exception. In this case the debug enable signal DB originates from the pipeline 13. Alternatively or additionally, the processor 2 may enable the debug mode to be triggered manually from the user terminal 24. Either way, in embodiments the debug signal DB is pre-context, i.e. a separate instance of the DB signal is provided between the pipeline 13 and fetch unit 14 for each context. Thus the debug mode can be controlled per context, such that one or more threads can be debugged while one or more others keep running in the normal operation.

Note: in embodiments, entering the debug mode for a given context may in fact involve sending two signals from the execution pipeline 13 to the fetcher 14: i) a stall signal, instructing the fetcher to stop fetching instructions from memory 22 for this context; and ii) the debug enable signal DB, indicating that the fetcher processor 14 is able to accept instructions from the debug instruction register 65 for this context. These two signals are commonly asserted together, although signal i) can be raised without signal ii). When the processor is able to accept instruction from the debug instruction register 65, writes into that register from the debugger 63 cause the instruction to be injected into the execution pipeline 13. If no write occurs, no instruction is injected.

The registers 65 in the debug interface 62 may also comprise one or more other types of register, as shown in FIG. 3.

Typically, the registers 65 in the debug interface 62 comprise at least one output register 69. This is the register into which the debug interface 62 copies values from other, internal registers of the processing module, such as the program state registers 26. As mentioned, the debug interface 62 is configured to be able to accept requests from the debug adapter 63, these requests including an identifier of an internal register 26 that the debug adapter 62 is requesting the value from (it cannot access these directly as it is only exposed to the interface registers 65 via the memory map, not all the internal state of the processing module 4). In response, the debug interface 62 retrieves the value currently held in the identified register 26 and places it in the output register 69 in the interface 62. The adapter 63 can then read the requested value from there, since it has access to the registers 65 in the interface 62. This in itself is a normal feature of a conventional debug interface 62 and adapter 63.

In embodiments, the registers 65 in the debug interface 62 may further comprise at least one debug data register 67 ($DBG_DATA). In embodiments this is a single register shared between all processor contexts and the debug adapter 63. It is readable and writeable by instructions (both injected and otherwise) as a "normal" CSR via put/get instructions. It is also directly readable and writeable by the debug adapter 63 via the debug interface 62 (i.e. doesn't require instruction injection to read/write). So, this register 67 can be used to share data (in both directions) between the injected debug code and the debugger. In variants of this idea, a plurality of debug data registers 67 could be provided, e.g. a separate register for each direction and/or each context, and/or multiple shared data registers 67.

In embodiments, none of the program state 26 is automatically saved by the hardware on the processor 2 upon entering the debug mode. This is another elegant simplification which can be enabled by the presently disclosed scheme. When the debug code is executed, it could start overwriting the contents of the operand registers and/or CSRs. Without saving this state, then when returning to the operational mode, it will not be possible to pick up again where the program left off. However, in embodiments disclosed herein, no hardware needs to be provided to automatically store anything. Instead, if the debug code needs to use registers in the ordinary register file(s) 26 as temporary storage (which typically it does), then the debug code will use the debug data register(s) 67 $DBG_DATA to store the current contents out to the host machine (the terminal) 64 before trashing the contents. $DBG_DATA is then later used by the final debug code to restore the register contents from the host machine 64, before returning to the operational mode.

As mentioned, in the case of a multi-threaded processing module 4, in embodiments the debug mechanism is configured to enable only an individual selected one of the contexts (i.e. time slot plus respective set of context registers 26) to be debugged. In this case, the registers 65 in the debug interface 62 comprise a context ID register 68 which identifies one of the contexts (or strictly, one of the time slots in the barrel-threaded sequence and the corresponding set of context registers 26). This enables the debug adapter 63 to write the ID of a selected context to the debug interface 62. Based on this, the debug interface 62 then controls the debug mode switching logic 70 to apply the debug mode only to the selected context (i.e. only in the respective time slot). In preferred embodiments, all other contexts are allowed to continue running normally (i.e. the fetch unit 14 continues to fetch instructions from memory 22 in those time slots).

FIG. 4 shows an example implementation for connecting the debug adapter 63 to the debug interfaces of multiple tiles 4. Here, the processor 2 comprises: the multiple tiles 4 (each configured as described in relation to FIG. 2), an interconnect 34 for enabling the tiles 4 to communicate application data with one another at least during normal operation, and a debug bus 71 enabling the debug adapter 63 to write to the registers 65 of the debug interface 62 on a selected one of the tiles 4. In order for the debug adapter 63 to select which tile to address via the bus 71, each tile 2 in the chip 2 has a unique identifier (e.g. integer identifier).

In embodiments, as illustrated, the debug bus 71 may take the form of a 1-bit wide daisy chain through all tile instances 4. In this case the debug interface 62 on each tile 4 only responds to commands (read/write etc.) which have the matching identifier, and simply passes on those commands which don't have a matching identifier. This is relatively slow but for debugging purposes this is acceptable, and may be preferably to taking up more space on chip with a more complex type of bus merely for debugging purposes. In embodiments, JTAG may be employed as the protocol for interfacing the debug adapter 63 to the debug interfaces 62 via the bus 71. However, other known protocols could be used instead.

Figure 5:
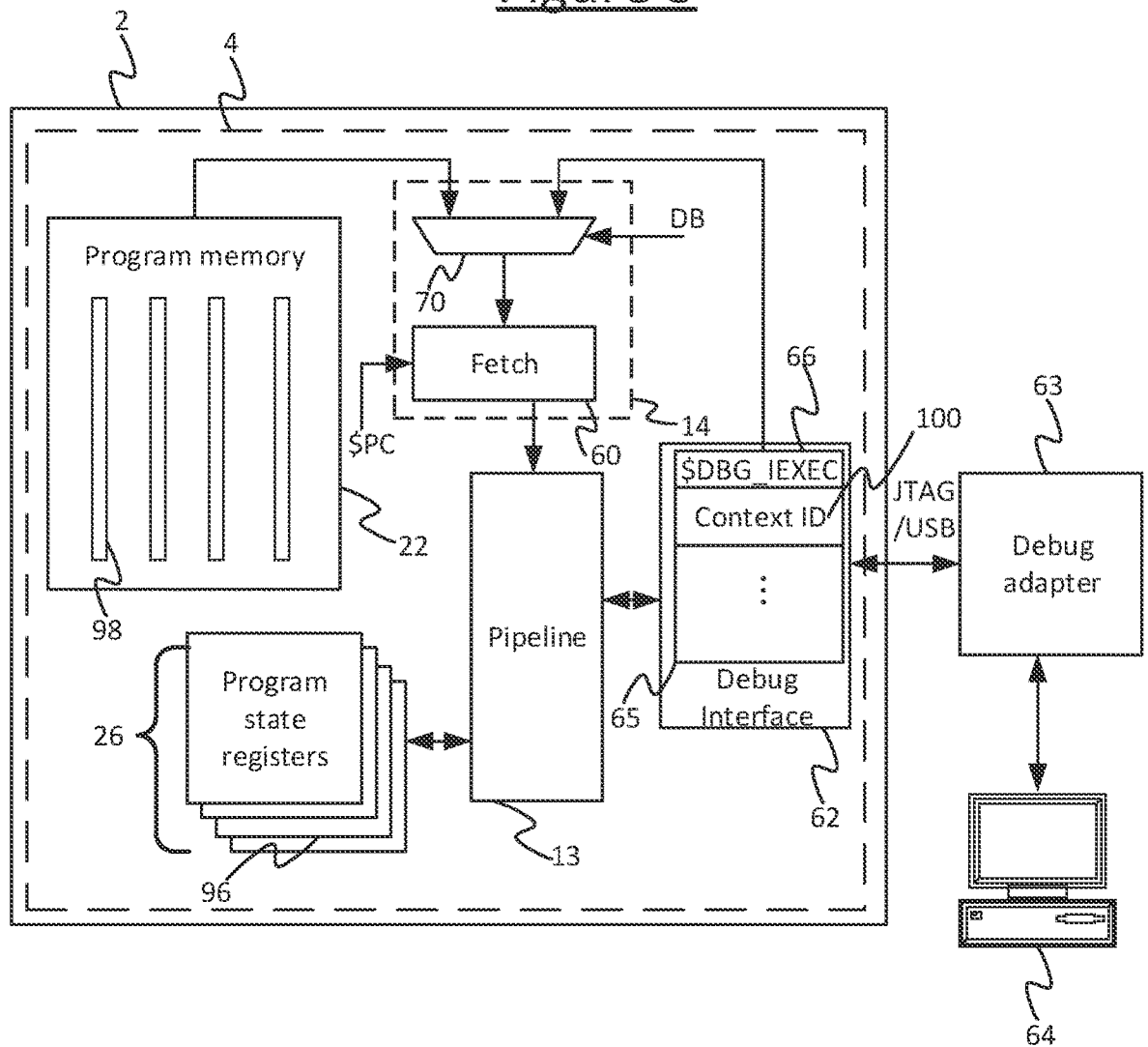
FIG. 5 is a schematic block diagram of a multi-threaded processor with a debugging mechanism in accordance with embodiments disclosed herein.

FIG. 5 shows a processor 2, wherein the instruction fetch unit 14 is configured to fetch machine code instructions from each of a plurality of concurrent threads 98 and interleave them through the pipeline 13 each in a respective time slot in a recurring sequence of time slots, and said program state registers 26 comprise a plurality of sets of context registers 96, each set arranged to represent a program state of a respective one of the concurrent threads 98, and the debug interface 62 comprises a context identifier register 100 writeable by the debug adapter 63 to identify one of the time slots. The instruction fetch unit 14 is configured to apply the debug mode only in the identified time slot, fetching the machine code instructions from the debug instruction register 65 only in place of the respective thread.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A processor comprising at least one processing module, each processing module comprising:
    an execution pipeline;
    memory;
    an instruction fetch unit operable to switch between an operational mode and a debugging mode, the instruction fetch unit being configured so as, when in the operational mode, to fetch machine code instructions from the memory into the execution pipeline to be executed;
    a set of program state registers for representing a program state of a program comprising the instructions being fetched from the memory in the operational mode; and
    a debug interface for connecting to a debug adapter;
    wherein the debug interface comprises a debug instruction register enabling the debug adapter to write a machine code instruction to the debug instruction register, and wherein the instruction fetch unit is configured so as, when in the debug mode, to fetch machine code instructions from the debug instruction register into the pipeline instead of from the memory;
    wherein the instruction fetch unit is configured to fetch machine code instructions from each of a plurality of concurrent threads and interleave them through the pipeline each in a respective time slot in a recurring sequence of time slots, and said program state registers comprise a plurality of sets of context registers, each set arranged to represent a program state of a respective one of the concurrent threads; and
    the debug interface comprises a debug context identifier register writeable by the debug adapter to identify one of the time slots, and the instruction fetch unit is configured to apply the debug mode only in the identified time slot, fetching the machine code instructions from the debug instruction register only, in place of the respective thread; and
    wherein the instruction fetch unit is configured to continue fetching the machine code instructions of the respective threads in the other time slots, other than the identified time slot, from the memory when the identified time slot is in the debug mode.

2. The processor of claim 1, wherein the debug interface comprises only one debug instruction register and the debug instruction register is arranged to hold only a single machine code instruction at a time.

3. The processor of claim 1, wherein the debug interface further comprises an output register readable by the debug adapter; and wherein the debug interface is operable to receive a request from the debug adapter requesting to read a specified one of the program state registers, and is configured to respond to the request by copying a value from the specified program state register into the output register to be read by the debug adapter.

4. The processor of claim 1, wherein the debug interface further comprises one or more debug data registers each arranged to be either of both of:
writeable by the debug adapter and readable by debug instructions executed by the pipeline, and/or
readable by the debug adapter and writeable by the debug instructions.

5. The processor of claim 4, wherein the processor comprises no hardware configured to automatically save any of the program state from the program state registers upon switching to the debug mode; and instead, some of the debug instructions save the program state to an external source via at least one of the one or more debug data registers, and then re-store the program state in the program state registers before returning to the operational mode.

6. The processor of claim 1, comprising a plurality of said processing modules, and a debug bus for making the connection between the debug adapter and the debug interface on each of the plurality of processing modules, the debug bus being arranged to enable the debug adapter to access the debug interface on a selected one of said processing modules, in order to write to the debug instruction register and any other registers of the debug interface writeable by the debug adapter on the selected processing module, and to read from any registers of the debug interface readable by the debug adapter on the selected processing module.

7. The processor of claim 6, wherein the bus is a 1-bit daisy chain bus, daisy-chaining between the plurality of processing modules.

8. The processor of claim 1, implemented on a chip wherein the debug adapter is an external debug adapter, the processor comprising one or more pins for enabling the debug adapter to form said connection from off-chip.

9. The processor of claim 1, wherein in the debug mode, the instruction fetch unit is caused to be clocked to fetch an instruction from the debug instruction register into the pipeline by the debug adapter writing a new instruction to the debug instruction register.

10. The processor of claim 1, wherein:
the program state registers include a program counter register arranged to hold a program counter value, the instruction fetch unit being configured so as, when in the operational mode, to fetch instructions from a location in the memory specified by the program counter value and to increment the program counter value in the program counter register with each instruction fetch; and
wherein the processor is further configured, upon switching to the debug mode, to pause the program counter value in the program counter register until returning to the operational mode, whereupon the instruction fetch unit continues from the program counter value left in the program counter register and resumes incrementing the program counter value.

11. A method of operating a processor comprising at least one processing module comprising an execution pipeline, memory, program state registers, an instruction fetch unit and a debug interface; wherein the method comprises:
operating the instruction fetch unit is configured to fetch machine code instructions from each of a plurality of concurrent threads and interleave them through the pipeline each in a respective time slot in a recurring sequence of time slots, said program state registers comprising a plurality of sets of context registers, each set arranged to represent a program state of a respective one of the concurrent threads;
operating the instruction fetch unit to switch between an operational mode and a debugging mode, wherein when in the operational mode, the instruction fetch unit fetches first machine code instructions from the memory into the execution pipeline to be executed;
receiving second machine code instructions to a debug register in the debug interface;
in the debug mode, operating the instruction fetch unit to fetch the second machine code instructions from the debug register into the execution pipeline;
operating the debug adapter to write to a debug context identifier register to identify one of the time slots, wherein the instruction fetch unit applies the debug mode only in the identified time slot, fetching the machine code instructions from the debug instruction register only, in place of the respective thread; and
wherein the instruction fetch continues fetching the machine code instructions of the respective threads in the other time slots, other than the identified time slot, from the memory when the identified time slot is in the debug mode.

12. The method of claim 11, wherein the second machine code instructions are received from the debug adapter external to a chip on which the processor is built.

13. The method of claim 11, wherein the debug interface comprises only one debug instruction register and the debug instruction register is arranged to hold only a single machine code instruction at a time.

14. The method of claim 11, wherein the fetching of the second machine code instructions includes: the instruction fetch unit being clocked to fetch an instruction of the second machine code instructions from the debug register into the pipeline by a debug adapter writing to the debug register.

15. The method of claim 11, comprising:
upon switching to the debugging mode, leaving a program counter value paused in a program counter register;
returning to the operational mode, whereupon the instruction fetch unit continues fetching the first machine code instructions from the paused program counter value; and
incrementing the program counter value from the paused program counter value.

16. A method of operating a processor having a plurality of processing modules, each processing module having an execution pipeline, a memory, program state registers, an instruction fetch unit and a debug interface, the method comprising, for at least one of the processing modules:
operating the instruction fetch unit is configured to fetch machine code instructions from each of a plurality of concurrent threads and interleave them through the pipeline each in a respective time slot in a recurring sequence of time slots, said program state registers comprising a plurality of sets of context registers, each set arranged to represent a program state of a respective one of the concurrent threads;
operating the instruction fetch unit in an operational mode, including the instruction fetch unit fetching first machine code instructions from the memory into the execution pipeline to be executed;
switching from the operational mode to a debug mode;
in the debug mode, receiving a second machine code instruction to a debug register in the debug interface; and operating the instruction fetch unit to fetch the second machine code instruction from the debug register into the execution pipeline; and operating the debug adapter to write to a debug context identifier register to identify one of the time slots, wherein the instruction fetch unit applies the debug mode only in the identified time slot, fetching the instructions from the debug instruction register only, in place of the respective thread;

wherein the instruction fetch continues fetching the instructions of the respective threads in the other time slots, other than the identified time slot, from the memory when the identified time slot is in the debug mode.

17. The method of claim 16, wherein the second machine code instruction is received from the debug adapter external to a chip on which the processor is built.

18. The method of claim 16, wherein the debug interface comprises only one debug instruction register and the debug instruction register is arranged to hold only a single machine code instruction at a time.

19. The method of claim 16, wherein the fetching of the second machine code instructions includes the instruction fetch unit being clocked to fetch an instruction of the second machine code instructions from the debug register into the pipeline by a debug adapter writing to the debug register, and wherein the method further comprises:

upon switching to the debugging mode, leaving a program counter value paused in a program counter register;

returning to the operational mode, whereupon the instruction fetch unit continues fetching the first machine code instructions from the paused program counter value; and incrementing the program counter value from the paused program counter value.

20. A processor comprising at least one processing module, each processing module comprising:

an execution pipeline;

memory;

an instruction fetch unit operable to switch between an operational mode and a debugging mode, the instruction fetch unit being configured so as, when in the operational mode, to fetch machine code instructions from the memory into the execution pipeline to be executed;

a set of program state registers for representing a program state of a program comprising the instructions being fetched from the memory in the operational mode, the program state registers including a program counter register arranged to hold a program counter value, the instruction fetch unit being configured so as, when in the operational mode, to fetch instructions from a location in the memory specified by the program counter value and to increment the program counter value in the program counter register with each instruction fetch; and a debug interface for connecting to a debug adapter;

wherein the debug interface comprises a debug instruction register enabling the debug adapter to write a machine code instruction to the debug instruction register, and wherein the instruction fetch unit is configured so as, when in the debug mode, to fetch machine code instructions from the debug instruction register into the pipeline instead of from the memory, wherein the processor is further configured, upon switching to the debug mode, to pause the program counter value in the program counter register until returning to the operational mode, whereupon the instruction fetch unit continues from the program counter value left in the program counter register and resumes incrementing the program counter value further configured such that:

the instruction fetch unit is configured to fetch machine code instructions from each of a plurality of concurrent threads and interleave them through the pipeline each in a respective time slot in a recurring sequence of time slots, and said program state registers comprise a plurality of sets of context registers, each set arranged to represent a program state of a respective one of the concurrent threads; and the debug interface comprises a context identifier register writeable by the debug adapter to identify one of the time slots, and the instruction fetch unit is configured to apply the debug mode only in the identified time slot, fetching the instructions from the debug instruction register only in place of the respective thread, and to continue fetching the instructions of the respective threads in the other time slots, other than the identified time slot, from the memory when the identified time slot is in the debug mode.

21. A processor comprising at least one processing module, each processing module comprising:

an execution pipeline;

memory;

an instruction fetch unit operable to switch between an operational mode and a debugging mode, the instruction fetch unit being configured so as, when in the operational mode, to fetch machine code instructions from the memory into the execution pipeline to be executed;

a set of program state registers configured to represent a program state of a program comprising the instructions being fetched from the memory in the operational mode, the program state registers including a program counter register arranged to hold a program counter value, the instruction fetch unit being configured so as, when in the operational mode, to fetch instructions from a location in the memory specified by the program counter value and to increment the program counter value in the program counter register with each instruction fetch; and a debug interface configured to connect to a debug adapter;

wherein the debug interface comprises a debug instruction register configured to enable the debug adapter to write a machine code instruction to the debug instruction register, and wherein the instruction fetch unit is configured so as, when in the debug mode, to fetch machine code instructions from the debug instruction register into the pipeline instead of from the memory, wherein in the debug mode, the instruction fetch unit is caused to be clocked to fetch an instruction from the debug instruction register into the pipeline by the debug adapter writing a new instruction to the debug instruction register, wherein the processor is further configured, upon switching to the debug mode, to pause the program counter value in the program counter register until returning to the operational mode, whereupon the instruction fetch unit continues from the program counter value left in the program counter register and resumes incrementing the program counter value;

further wherein a plurality of different thread contexts are interleaved in a round-robin schedule, such that in the operational mode, each thread context is clocked to fetch a next instruction according to the round robin schedule, and each thread context determines which instruction to fetch next by its respective program counter, and wherein in the debug mode a given individual selected one of the thread contexts is instead caused to be clocked by the debug adapter writing a corresponding instruction to the debug instruction register, such that the given individual selected one of the thread contexts is clocked to fetch from the debug instruction register each time the debug adapter writes to the debug instruction register and is not clocked when there is no write from the debug adapter to the instruction register, further wherein in the debug mode, other thread contexts continue running in the round robin schedule so that respective instruction fetch locations are determined by respective program counters;

wherein the debug instruction register comprises a context identifier register, which is configured to identify the selected one of the thread contexts, and wherein the debug adapter is configured to write an identification of the selected one of the thread contexts from the context identifier register to the debug interface.

* * * * *